United States Patent [19]
DeLuca et al.

[11] Patent Number: 4,870,402
[45] Date of Patent: Sep. 26, 1989

[54] MULTILINGUAL PAGING SYSTEM

[76] Inventors: Joan S. DeLuca, 550 SW. 6th Ave.; Charles M. Mellone, 732 NW. 6th Dr., both of Boca Raton, Fla. 33432; Mark T. Stair, 3207-C Spanish Well Dr., Delray Beach, Fla. 33445

[21] Appl. No.: 926,289

[22] Filed: Nov. 3, 1986

[51] Int. Cl.⁴ .............................................. G08B 5/22
[52] U.S. Cl. ........................... 340/825.440; 340/311.1; 364/419
[58] Field of Search .................... 340/825.44, 825.48, 340/311.1, 365 VL, 790; 400/484; 455/31, 38; 364/419; 370/118; 375/122

[56] References Cited

U.S. PATENT DOCUMENTS

| | | | |
|---|---|---|---|
| 2,681,385 | 6/1954 | Oliver | 375/122 |
| 3,996,584 | 12/1976 | Plager | 340/790 |
| 4,021,608 | 5/1977 | Brodeur | 340/825.44 |
| 4,122,533 | 10/1978 | Kubinak | 340/790 |
| 4,124,843 | 11/1978 | Bramson et al. | 340/365 VL |
| 4,137,425 | 1/1979 | Ferroglio et al. | 178/30 |
| 4,429,306 | 1/1984 | Macauley et al. | 340/790 |
| 4,437,095 | 3/1984 | Akahori et al. | 340/825.44 |
| 4,618,860 | 10/1986 | Mori | 340/825.44 |
| 4,644,352 | 2/1987 | Fujii | 340/825.44 |

FOREIGN PATENT DOCUMENTS 2149627 6/1985 United Kingdom ................ 340/790

Primary Examiner—Donald J. Yusko
Assistant Examiner—Edwin C. Holloway, III
Attorney, Agent, or Firm—William E. Koch; Vincent B. Ingrassia

[57] ABSTRACT

A communication system and in particular a paging system for transmitting information includes a keyboard, an encoder, a transmitter, a paging, the paging receiver comprising, a decoder, a microprocessor, and a display. Entered information includes a plurality of languages and a corresponding language select signal, each language comprised of a plurality of characters. To increase throughput, the language characters are compressed by the encoder to a common set of characters. The information including the languages is transmitted to a plurality of selectable paging receivers. The paging receiver decodes the information and converts the transmitted received characters to corresponding language symbols according to the transmitted received language select signal. The language symbols are then displayed on the display.

26 Claims, 12 Drawing Sheets

FIG. 7

| SPECIAL SYMBOL SET 1 | | |
|---|---|---|
| ALTERNATE | 0 | ä |
| ALTERNATE | 1 | ö |
| ALTERNATE | 2 | ü |
| ALTERNATE | 3 | ñ |
| ALTERNATE | 4 | £ |
| ALTERNATE | 5 | ¥ |
| ALTERNATE | 6 | SPARE |

| SPECIAL SYMBOL SET 2 | | |
|---|---|---|
| ALTERNATE | 7 | Ç |
| ALTERNATE | 8 | é |
| ALTERNATE | 9 | è |
| ALTERNATE | : (A) | ê |
| ALTERNATE | ; (B) | ¿ |

| SPECIAL SYMBOL SET 3 | | |
|---|---|---|
| ALTERNATE | < (C) | Å |
| ALTERNATE | = (D) | β |
| ALTERNATE | > (E) | Ö |
| ALTERNATE | ? (F) | § |
| ALTERNATE | @ (10) | £ |

*FIG. 8*

MULTILINGUAL PAGING SYSTEM

CROSS REFERENCE TO RELATED PATENT APPLICATIONS

The present patent application is one of two co-pending patent applications which concern the same overall method of transmitting a plurality of languages to a paging receiver but which individually claim different inventive concepts embodied in such an overall paging system configuration. This related patent applications was filed on the same day, namely Nov. 3, 1986, and is specifically incorporated by reference herein and are more particularly described as follows:

(1) U.S. Patent Application No. 926,484 entitled "Foreign Language Paging System", having attorneys docket number CM00539J, the inventors being Reuven, et al.

BACKGROUND OF THE INVENTION

1. Field of the Invention

The present invention relates to communication systems and more particularly to a communication system capable of transmitting data messages comprising a plurality of languages.

2. Background Discussion

Communication systems in general and paging systems in particular- using transmitted call signals have attained widespread use for calling selected receivers to transmit information from a base station transmitter to the receivers. Modern paging receivers have achieved multifunction capability through the use of microcomputers which allow the paging receiver to respond to information having various combinations of tone, tone and voice, or data messages. The information is transmitted using any number of paging coding schemes and message formats. The paging coding schemes preferably are of the multi-character word length type, where the character may be a binary digit or the like. Prior art paging systems have been able to transmit and receive data message information in only one language such as English. The languages referred to in the present invention have as a common denominator symbols and words arranged in a traditional semantic relationship. The widespread use of paging systems now require that data messages comprised of different languages be transmitted to a paging receiver for receiving and displaying the symbols of the languages to the paging receiver user. These languages include alphabetic languages such as English, French, German, or the like as well as ideographic languages such as Japanese, Chinese, or the like.

In the operation of such paging receivers, important factors involved in their successful operation is the portability of the receiver, the limited energy available for the receiver, the amount of memory available for the paging receiver's microcomputer, the limited availability of the radio spectrum, the fast response time required in today's active society, and the number of paging receivers included in the paging system. In such paging receivers, in order that the drain on the battery may be minimized, the paging receiver is systematically turned off and turned on to maximize the length of time energy is available from the batteries. The limited energy in which the paging receiver must operate limits the memory and minimizes the electronic circuitry such as the display in the paging receiver. The fast response time and the number of paging receivers requires the data messages to be compressed. In the case of sending data messages including a plurality of languages, the characters for each language are compressed to a common set of characters before transmission. Within these constraints, a paging receiver must commercially operate.

The known prior art consists of existing printing systems and CRT terminals adopted to print text material in different languages. For instance, U.S. Pat. No. 3,996,584 shows a display for a CRT terminal which uses two character generators for displaying different groups of characters. Another example of the prior art is U.S. Pat. No. 4,122,533 which shows a character generating system for a photocomposition machine for displaying alphanumeric symbols on a CRT for any language selected from a group of languages. These prior art systems, however, did not operate under the constraints required of a paging receiver. These constraints are the limited power available to the paging receiver, the demand on the radio spectrum, the limited memory, the portability, the data compression, and the real time response required for a paging receiver in a paging system.

SUMMARY OF THE INVENTION

The present invention has been developed for the purpose of providing a multilingual communication system. Accordingly, the invention has as its object a method for transmitting a plurality of languages to a communication receiver and displaying the same.

It is an object of the present invention to provide a communication system for transmitting, receiving, and displaying alphabetic type languages and ideographic type languages included in one data message to a communication receiver.

It is another object of the present invention to provide a display for a communication receiver, such as a paging receiver, adapted to produce symbols for a data message comprised of a plurality of languages wherein the languages are either alphabetic languages such as English or the like or ideographic languages such as Japanese.

It is another object of the present invention to provide a method for producing a display for a selectable language on a communication receiver, such as a paging receiver, the language being selected from either an alphabetic language or an ideographic language.

These, as well as other objects and advantageous features of the present invention, will be in part apparent and in part pointed out hereinafter.

In general, a communication system for transmitting information includes a means for entering the information, an encoding means, a transmitting means, a receiving means such as a paging receiver, a decoding means, a converting means, and a displaying means. The information, including a plurality of languages and a corresponding language select signal, is fed to an input means such as a keyboard. Each language includes a plurality of symbols in a traditional order. The language select signal is representative of the language of the symbols. To increase throughput, the symbols are compressed by the encoding means to a common set of characters or symbols. The information, including the common set characters and language select signal, are transmitted to at least one of a plurality of selectable paging receivers. The paging receiver receives the transmitted information and decodes the information for providing a plurality of symbol signals and a language mode signal. Each symbol signal corresponds to a transmitted symbol while the language mode signal corresponds to the language for interpreting the symbols. A processing means such as a microcomputer converts each symbol signal to a language symbol according to the language mode signal. The symbol is then transmitted to a display means for producing a text display of the symbols for a paging receiver user.

Also in general and in one form of the invention, a method is provided for transmitting sequentially a selected language from a plurality of languages to a communication receiver, such as a paging receiver. In this method, information is entered into a base terminal by keyboard, the information including a plurality of symbols representative of the selected language being transmitted and a language select signal. The base terminal transmits the information to at least one of a plurality of selectable paging receivers. The paging receiver includes a microprocessor for decoding the information. The microprocessor converts the information received from the transmitter to a corresponding language which is displayed on a local display of the paging receiver.

Also in general and in one form of the invention, a method is provided for transmitting a plurality of sets of characters, each of the sets of characters defining a respective language. An input device such as a keyboard generates the characters and identifies the characters as a base language or an alternate language. When the paging receiver is in a base language mode, characters identified as an alternate language have a control signal. When the paging receiver is in an alternate language mode, base language characters and other alternate language characters are transmitted having a control signal. The characters are fed to an encoder of the base station for data compression to a common set of characters and then transmitted to a selected paging receiver. The paging receiver decodes the information for displaying the characters transmitted.

BRIEF DESCRIPTION OF THE DRAWINGS

For the purpose of illustrating the invention, there is shown in the drawings an embodiment which is presently preferred, it being understood, however, that the invention is not limited to the precise arrangements and instrumentality shown.

FIG. 7 shows the correspondence between character codes and character pattern or symbol in the character generator ROM.

FIG. 8 illustrates the special symbols which can be displayed for one particular embodiment of the present invention.

DETAILED DESCRIPTION OF THE INVENTION

1. General Description

Figure 1:
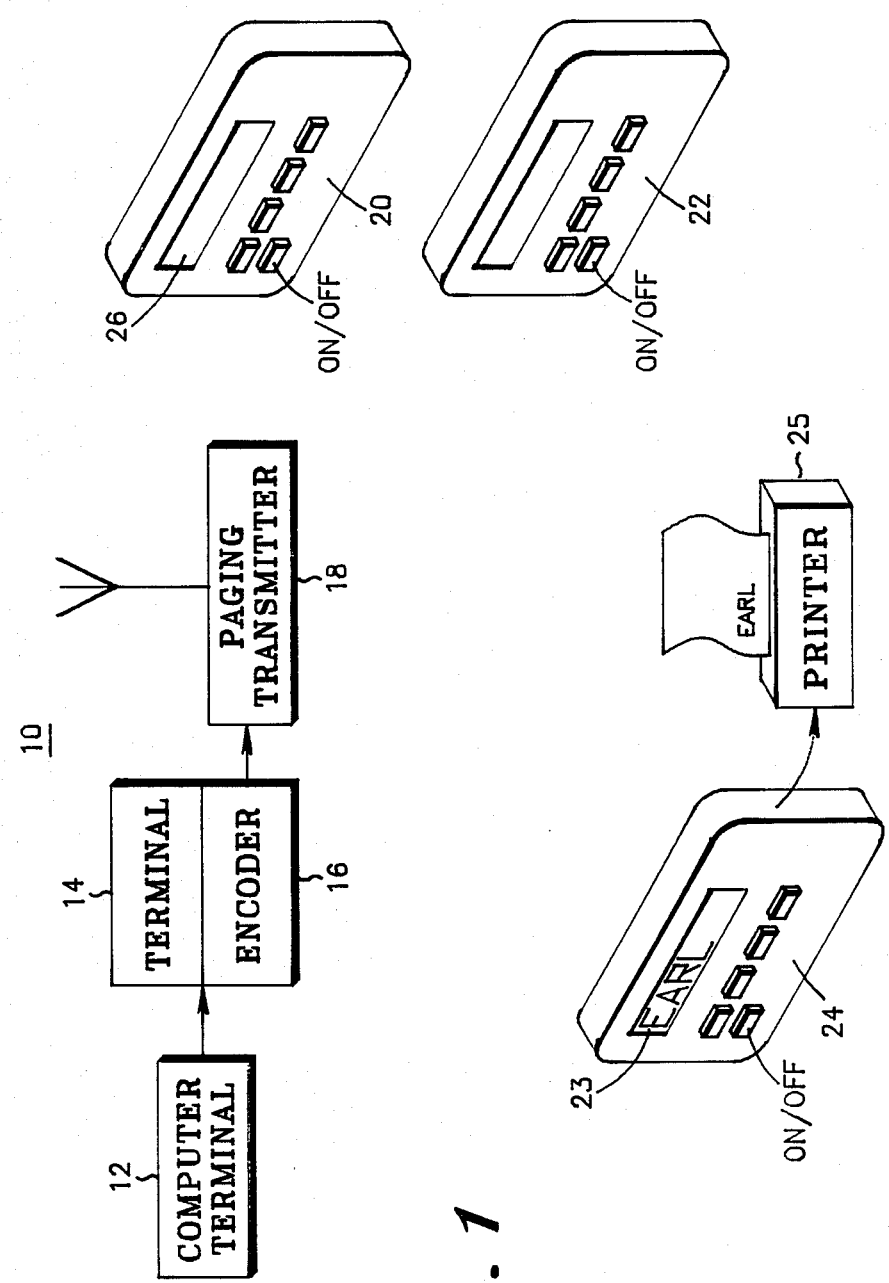
FIG. 1 a schematic diagram of a typical paging system employing the present invention.

With reference to the drawings in general, there is illustrated a paging system 10 and method in one form of the invention of transmitting a plurality of languages from a base terminal 14 to a plurality of selectable paging receivers 20-24. In this method, a language comprised of symbols or characters in a traditional order are entered on a keyboard 12, the symbols being transmitted to the base station terminal 14. Depending upon the capability of the keyboard, any number of languages may be entered. However, in one form of the invention, the symbols entered are representative of a base language for the keyboard 12. If an alternate language is selected for transmission, the keyboard 12 generates a control signal corresponding to the alternate language which accompanies the alternate set of symbols being sent to the base station terminal 14. The base station terminal transmits the symbols to an encoder 16 which compresses the symbols to a common set of symbols. The common set of symbols are transmitted to a plurality of selectable paging receivers such as paging receiver 20.

Paging receiver 20 receives the information from paging transmitter 18 and converts the information to a plurality of symbols representative of the language transmitted. The paging receiver includes a processing means such as a microcomputer for detecting the control signal corresponding to one of the alternative languages for selecting the appropriate symbols to display on a display 26 of the paging receiver. The paging receiver 20 includes internal circuitry having a receiver means, a decoder means, a processing means, a display driving means, and a display means such as display 26, all of which are well known in the art. The microcomputer 36 converts the received symbols and supplies the display driving means information including the symbols of the language for producing display symbols on display 26. While any appropriate paging receiver can be used, one suitable paging receiver is an "OPTRX" Series Display Radio Pager, manufactured by Motorola, Inc. A manual entitled "Instruction Manual" and having an identification number of 68P81035C55-0, describing in detail the operation and circuitry of the paging receiver is hereby incorporated by reference.

The operation of the system shown in FIG. 1 is such that the paging receivers are capable of receiving messages in any of several message formats or signalling patterns. While the present invention is described hereinafter with particular reference to on paging mode scheme, it is to be understood at the outset of the description which follows it is contemplated that the apparatus and methods, in accordance with the present invention, may be used to transmit a plurality of languages in one data message using other paging schemes. This description is not to be taken in a limiting sense but is made merely for the purpose of illustrating the general principals of the invention.

A basic signalling pattern or message format that is used in this paging receiver is a sequence of coded binary data using the Golay Sequential Code (GSC). However, other message formats such as the British Post Office paging system format (POCSAG) may be used with other paging receivers. While the present invention may be applied to any number of pager coding schemes and message formats, they are preferably of the multi-character word length type where the character may be a binary digit or the like.

Briefly, the Golay Sequential Code is an asynchronous paging format that allows pages to be transmitted individually or in batches and accommodates tone only, tone and data, and tone and voice paging. In the Golay Sequential code, a single call address format consists of a preamble, a start code, an address code, and for voice paging, an activation code. Paging receivers within the system are divided into groups by way the preamble, which serves to improve battery life, as well as to differentiate Golay Sequential Code transmission from other coding schemes.

The preamble facilitates channel sharing without sacrificing battery life or false call integrity. The start code marks the end of the preamble and supplies timing information for batch mode decoding. The address code uniquely identifies each pager and the activation code controls the pager's audio circuits for voice paging. The batch mode of operation allows a string of addresses to be transmitted following a start code.

A data message includes an address followed by one or more data blocks. Data messages may be transmitted individually in the single call mode, or intermixed with address only pages in the batch mode transmission. Address and data blocks are exactly the same length. The address information is constructed from words selected from the Golay (23,12) signalling code, and the data information is encoded using the (15,7) Bose, Chaudauri, and Hocquenhem (BCH) code. The preamble, start code, address code, and activation code are transmitted at 300 bits per second, whereas the data information is transmitted at 600 bits per second.

In addition to enabling pagers to operate in a battery saver mode, the polarity of the preamble identifies the transmission mode, single call or batch. For instance, when the preamble words are transmitted with one predetermined bit polarity, the single call mode is identified; if the preamble bits are inverted, the batch mode is indicated.

The sync code, activation code, and address code all use two word formats consisting of 28 bits of comma followed by two (23,12) code words. The two Golay code words (WORD 1 and WORD 2) are separated by a half bit space. The polarity of the half bit space is opposite the first bit of the second word, and the starting comma bit is the same polarity as the first bit of the first word. The sync code and activation code are predetermined for the particular paging system and are fixed and defined for the particular paging system.

The address format is identical to the sync and activation code formats in regard to the number of bits, the rules for comma and half bit space. The GSC address contains a two-word format (WORD 1 and WORD 2). The two-word format of the GSC address includes a built-in multifunction capability. The paging receiver's decoder correlators that compare the received code word to the pager's word can detect the normal word and inverse word. In other words, the two words correspond to four function of the paging receiver known as paging modes. They are:

Function 1 - WORD 1, WORD 2
Function 2 - WORD 1, $\overline{\text{WORD 2}}$
Function 3 - $\overline{\text{WORD 1}}$, WORD 2
Function 4 - $\overline{\text{WORD 1}}$, $\overline{\text{WORD 2}}$ These combinations are used to designate the type of page (tone only, data, and voice). By allowing for two independent WORD 2's, eight functions can be assigned to a single pager.

The data information such as the plurality of language characters use only six bits for transmitting each language character to the paging receiver. This set is a slight version of a standard ASCII 8 bit code with the 8th and 6th bit not transmitted and the 7th bit shifted to the 6th bit position before transmission. This is equivalent to subtracting 20 hexidecimal from each character. The purpose of compressing ASCII characters is to increase the throughput data messages in the paging system.

2. Base Station

More particularly and with specific reference to FIG. 1, there is shown a paging system 10 of the present invention having a base station including an input means 12, terminal 14, encoder 16, and transmitter 18. The input means such as keyboard 12 enters symbols of a language into the paging system. Preferably, the keyboard 12 has a plurality of keys selectively mapped in a base language. The keyboard 12 is also capable of entering more than one language type. However, for the sake of simplicity, the following discussion will refer to a base language such as English, an alternate language such as Japanese (Kata Kana), and an optional alternate language comprised of other symbols such as special foreign characters, the keyboard 12, terminal 14, and paging receivers being originally configured for the base language and selectively configured for the alternate language. It is to be noted that Kata Kana is a type of Japanese phonetic symbol system used in general to write foreign-sounding loan-words and onomatopetic terms, and to transcribe foreign personal; and place names.

While the present invention is described hereinafter with particular reference to the base and alternate language, it is to be understood at the outset of the description which follows it is contemplated that the apparatus and methods, in accordance with the present invention, may be used to transmit any one of a plurality of languages sequentially within one data message, each language having a plurality of symbols also within a single data message. These include but are not limited to alphabetic languages such as French, German, Spanish or the like and ideographic languages such as Chinese, Korean, Japanese or the like. Each alternate language has a corresponding control signal such as a control character and a corresponding symbol area in a character generator in the paging receiver, as which will be described subsequently.

Either the base language symbols or the alternate language symbols are entered into the keyboard for subsequent transmission to base terminal 14. If the paging receiver is determined to be configured for the base language, a control signal is not entered via the keyboard 12 with base language symbols. If the selected paging receiver is configured for the base language and an alternate language is entered, a control signal is generated by the keyboard which is subsequently transmitted.

For instance, if paging receiver 20 is configured for a base language of English, and an optional alternate language of special foreign characters, an alternate language of Kata Kana, entering Kata Kana in keyboard 12 generates a control signal such as a control character for the Kata Kana language. In one form of the invention, this is accomplished by simultaneously activating the shift key and a Kata Kana symbol key on the terminal. Other methods are available for generating a control signal corresponding to a language. Attention is directed to U.S. Patent Application No. 926,484, filed Nov. 3, 1986, entitled "Foreign Language Paging System", having attorney's docket number CM00539J. The terminal 14 processes the language symbols entered at the keyboard and other appropriate signals to activate the selected paging receiver in the encoder 16. The encoder converts the language symbols to a common language set and transmits the information to the paging transmitter 18 which transmits the information via radio frequencies to at least one of a selected plurality of paging receivers 20–24. Additionally, a paging receiver such as paging receiver 24 can have a hard copy unit such as printer 25 connected for producing a hard copy of the contents of display 23.

Figure 2:
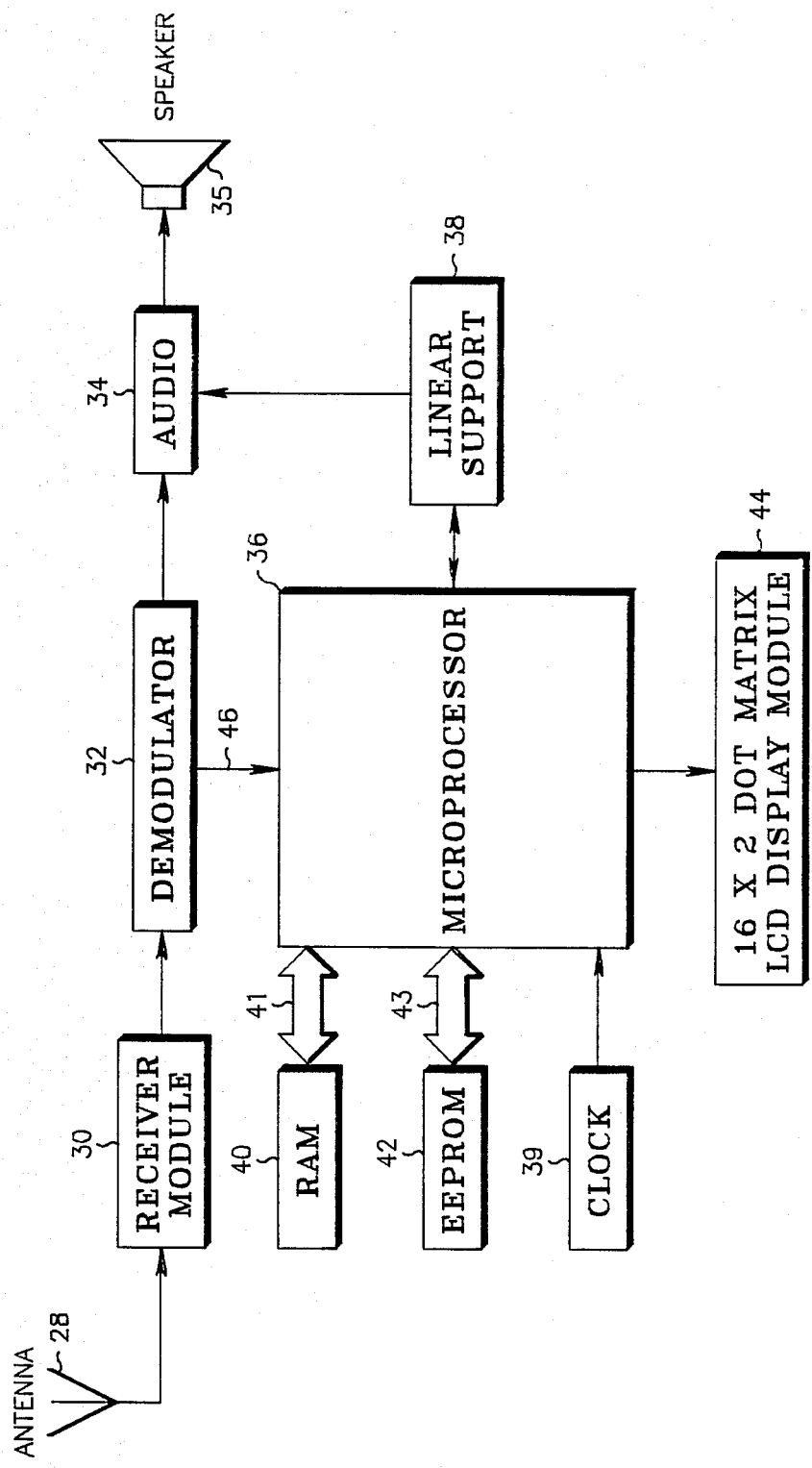
FIG. 2 illustrates a functional block diagram of a paging receiver adapted for using the method of the present invention.
Figure 3:
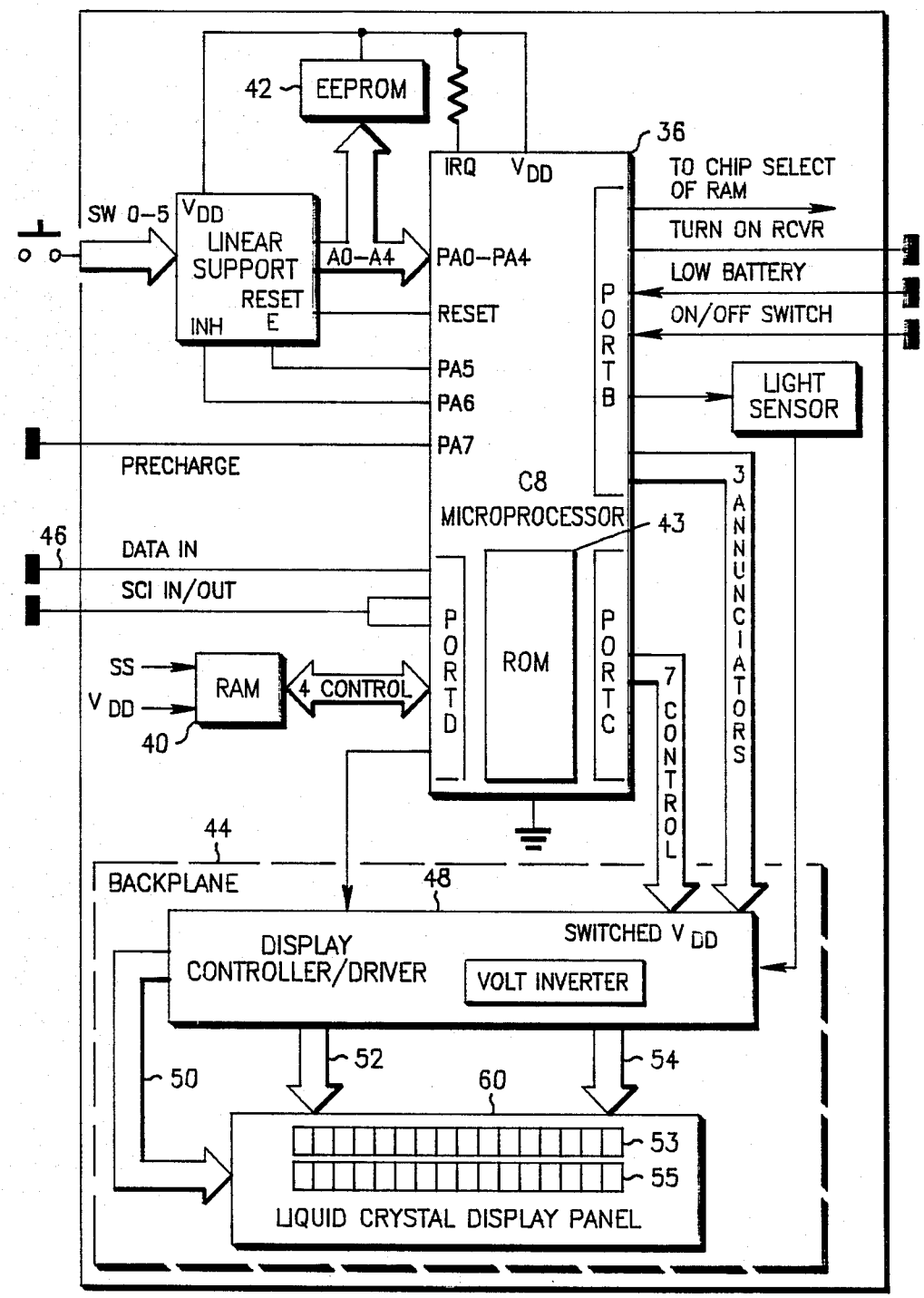
FIG. 3 is a detailed diagram of the display, microcomputer, memory, and code memory of the paging receiver.

The base languages and alternate language for the paging receiver are typically predetermined. The paging receiver is initially configured having a preprogrammed memory or code memory identifying the designated base language and the alternate language. Attention is directed to FIGS. 2 and 3 for a more detailed explanation of the code memory.

3. Paging Receiver

FIG. 2 shows a functional block diagram showing a paging receiver adapted for the present invention. An antenna 28 is connected to a receiver module 30 which is connected to a demodulator 32. The RF carrier signal is mixed with a local oscillator and an injection signal in the receiver module 30 generating a lower frequency IF signal suitable for processing by the demodulator 32 in a manner well known to one skilled in the art. The IF signal is fed to the demodulator 32 which serves to convert the IF signal to the address, message data, and recovered audio components of the original signal. For voice pages, the recovered audio output (voice) is fed to the audio unit 34 for generating an audio signal on speaker 35. For data messages, the address and message data is applied to an input of a microcomputer 36. The microcomputer 36 decodes the address data in a known fashion and compares the result with predetermined addresses contained in code memory 42 to produce output signals to process the message data and to alert the user that a message has been received. One of the output signals from the microcomputer 36 is supplied to the dot matrix liquid crystal display module 44 to produce an alphanumeric display of the data message. Another output signal is supplied to the audio unit 34 to produce a signal indicative of a receipt of a message. A linear support module 38 includes peripheral devices such as a DC-DC converter and a deadman timer to support the operations of the microcomputer 36 in a manner well known to those of ordinary skill in the art.

A clock signal, as derived from a sample clock 39, is applied to the microcomputer 36 to control the rate at which the receive signals are processed. It is understood that microcomputer 36, such as an MC68HC05C8 8-bit microcomputer manufactured by Motorola, Inc., uses clock 39, as is well known in the art, for controlling its internal operations as well as its interface with other elements of the paging receiver 20. The microcomputer 36 is coupled by a data bus 43 to an electrically erasable programmable read only memory (EEPROM) 42 and by a data bus 41 to a random access memory (RAM) 40. Memory 42 is the code memory which includes the pager addresses and identifies in one form of the invention the base and alternate languages. The RAM 40 is adopted to store the data which microcomputer 36 converts from the received signals from the base terminal, to process these signals including decoding, and to appropriately store the process signal in designated areas of the RAM 40. The programs or routines to operate microcomputer 36 are stored in an on chip ROM and are explained generally with respect to FIGS. 3–7 and in detail with respect to FIGS. 8–9A–B.

In the Motorola "OPTRX" paging receiver, the data messages including the language symbols decoded by microcomputer 36 are viewed on a high contrast, dot matrix liquid crystal display unit 44. The messages formed by the liquid crystal display are formed by two rows of 16 by 8 segment liquid crystal dot matrix characters giving each character a $5 \times 7$ display pattern. Each message can be comprised of base language symbols or alternate language symbols. For a better understanding of the configuration and functional cooperation of the components described briefly above, attention is directed to FIGS. 8–9 of the drawings wherein the method for displaying the base language and alternate languages are illustrated in detail.

FIG. 3 shows a more detailed diagram of the display means 44, microcomputer 36, memory means such as RAM 40, and code memory 42. Data from demodulator 32 are applied to microcomputer 36 via data line 46. An on chip ROM 43 includes the programs for manipulating the data received by microcomputer 36 to display either base language symbols or the alternate language symbols on display means 44. Display means 44 includes a display controller driver 48 and signal lines 50–54. The signal lines 50–54 drive the LCD panel 60 to selectively illuminate the dot matrix formed by the intersection of segment lines 52 and 54 with the common lines 50. In the particular paging receiver shown, the LCD panel includes a first row 53 and second row 55 of display patterns. The process to either display base language symbols or alternate language symbols is discussed in detail with reference to FIGS. 8–9.

Figure 4:
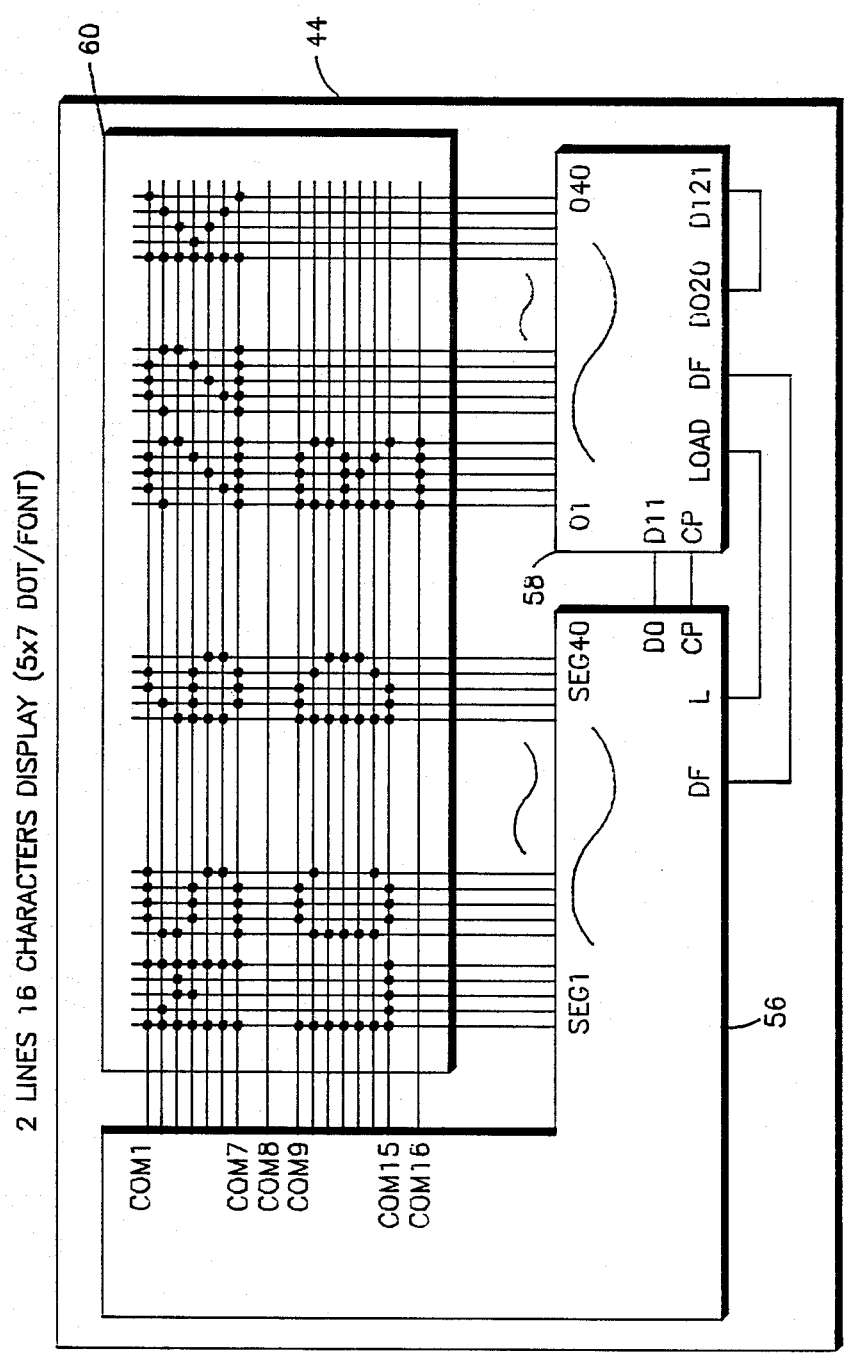
FIG. 4 is an electrical diagram of the dot matrix liquid crystal display showing the LCD drivers and LCD panel.

FIG. 4 shows an electrical diagram of the display means 44. Display means 44 includes a first display driver and controller 56 and a second display driver 58. The first display driver 58 drives segments 1–40 of the dot matrix liquid crystal display panel 60, while the second driver drives segments 41–80 of the liquid crystal display panel 60 in a manner well known in the art.

Figure 5A:
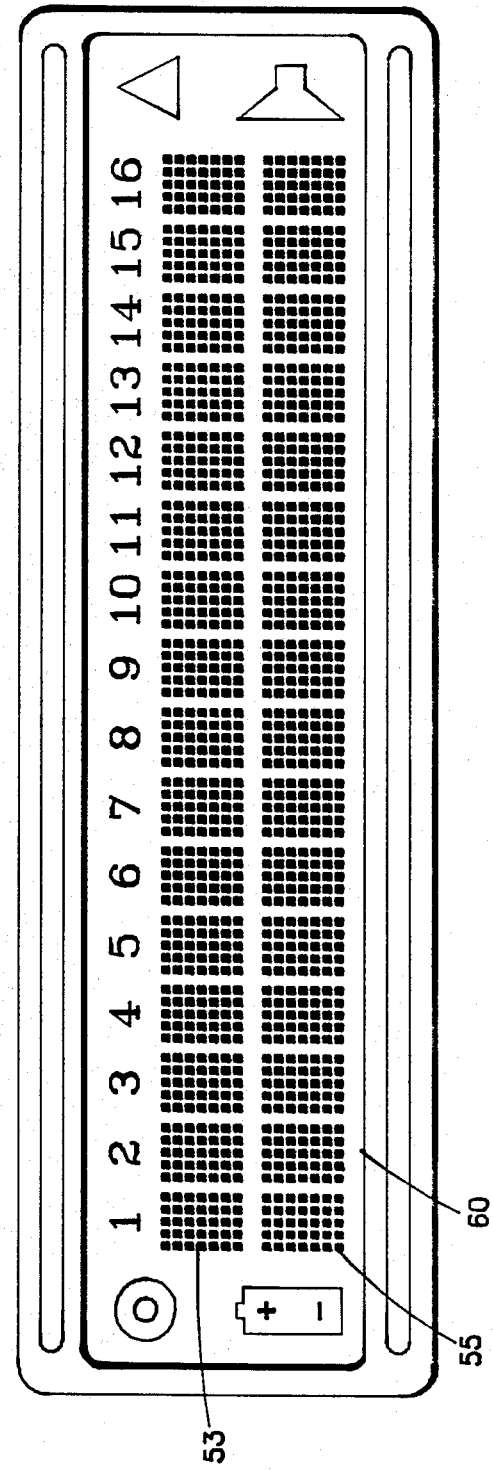
FIG. 5A–B is a mechanical diagram showing one particular embodiment of a display pattern for a dot matrix liquid crystal display panel of the present invention.
Figure 5B:

Referring to FIG. 5A, there is shown the physical layout of liquid crystal display panel 60. The display panel 60 includes a first and second row of 16 display patterns comprised of a $5 \times 7$ dot matrix. FIG. 5B illustrates a single $5 \times 7$ matrix. A very large number of symbols or characters can be displayed on one matrix pattern by individually illuminating each dot of the $5 \times 7$ dot matrix. Since a large number of symbols can be represented by a $5 \times 7$ dot matrix, it will be appreciated that a large number of languages can be displayed on LCD display panel 60. These include alphabetic languages such as English, German, French or the like, and ideographic languages such as Japanese or the like.

Chinese, however, has a very large number of symbols comprising its language. One dialect of Chinese has over 3,500 symbols. In order to display such a large number of symbols, the resolution of the display panel must be increased. As is evident to display Chinese, the resolution of the panels is increased to a resolution greater than 5×7. A suitable display controller is a dot matrix LCD which is sold by Oki Semiconductor under their designation MSM6265GS. Furthermore, Chinese is read from the bottom to the top. In displaying Chinese symbols, each character is rotated ninety degrees before being displayed. The display 60 is also rotated ninety degrees in the same direction so that the rows run in a vertical direction. Thus, after rotation of display 60 and each symbol, the Chinese symbol are displayed in a bottom-to-top fashion with the first character appearing at the bottom of the display panel 60. Note that the symbols can be prestored in a memory so that each symbol does not have to be rotated each time.

Figure 6:
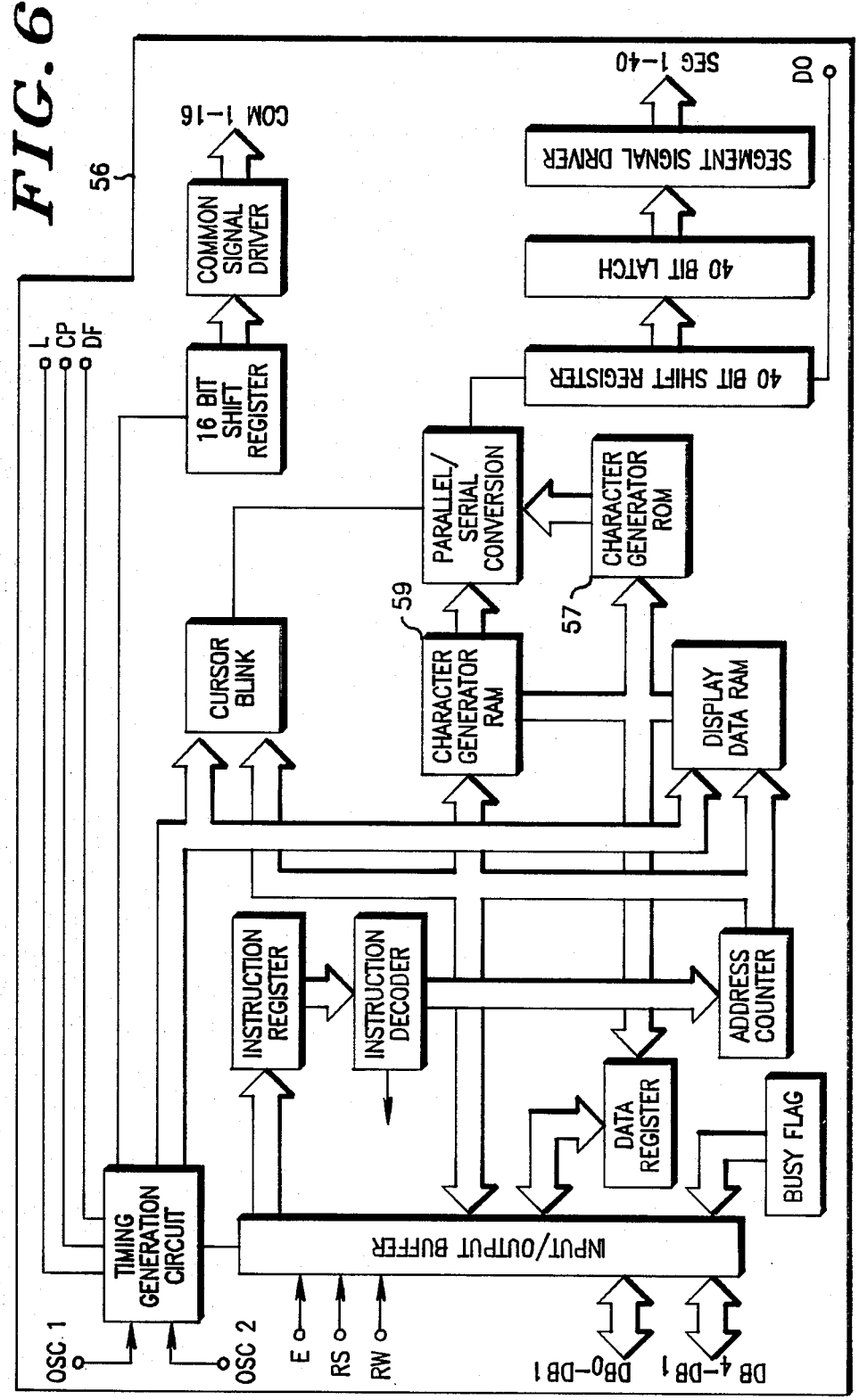
FIG. 6 is a block diagram of the LCD driver illustrating the character generator RAM and the character generator ROM.

Referring to FIG. 6, there is illustrated a block diagram of LCD driver and controller 56. While any appropriate display driver can be used, one suitable display driver and controller is an MS6222 dot matrix LCD 40 dot segment driver with 16-dot common manufactured by Oki Semiconductor, Inc. A suitable additional display driver 58 is an MSM5839DGS dot matrix LCD 40 dot segment driver manufactured by Oki Semiconductor, Inc. Both LCD drivers convert data from the microcomputer to parallel data and output an LCD driving wave forms to the LCD panels. As is evident, since the drivers 56 and 58 give the microcomputer 36 control over each dot of the dot matrix, any symbol can be programmably developed by the microcomputer.

For example, for normal English characters, an on chip character generator ROM 57 includes memory having English characters and generates the appropriate signals for displaying the English characters in response to the code received. The on chip character ROM 57 also includes memory for alternate language characters. In addition, a character generator RAM 59 includes a volatile memory for generating optional symbols or characters. The microcomputer 36 generates the particular dot pattern bit by bit for the character generator RAM 59 to display microcomputer generated characters. ROM 57 may be thought of as containing hardware generated characters, while RAM 59 may be thought of as containing software generated characters.

Figure 7:
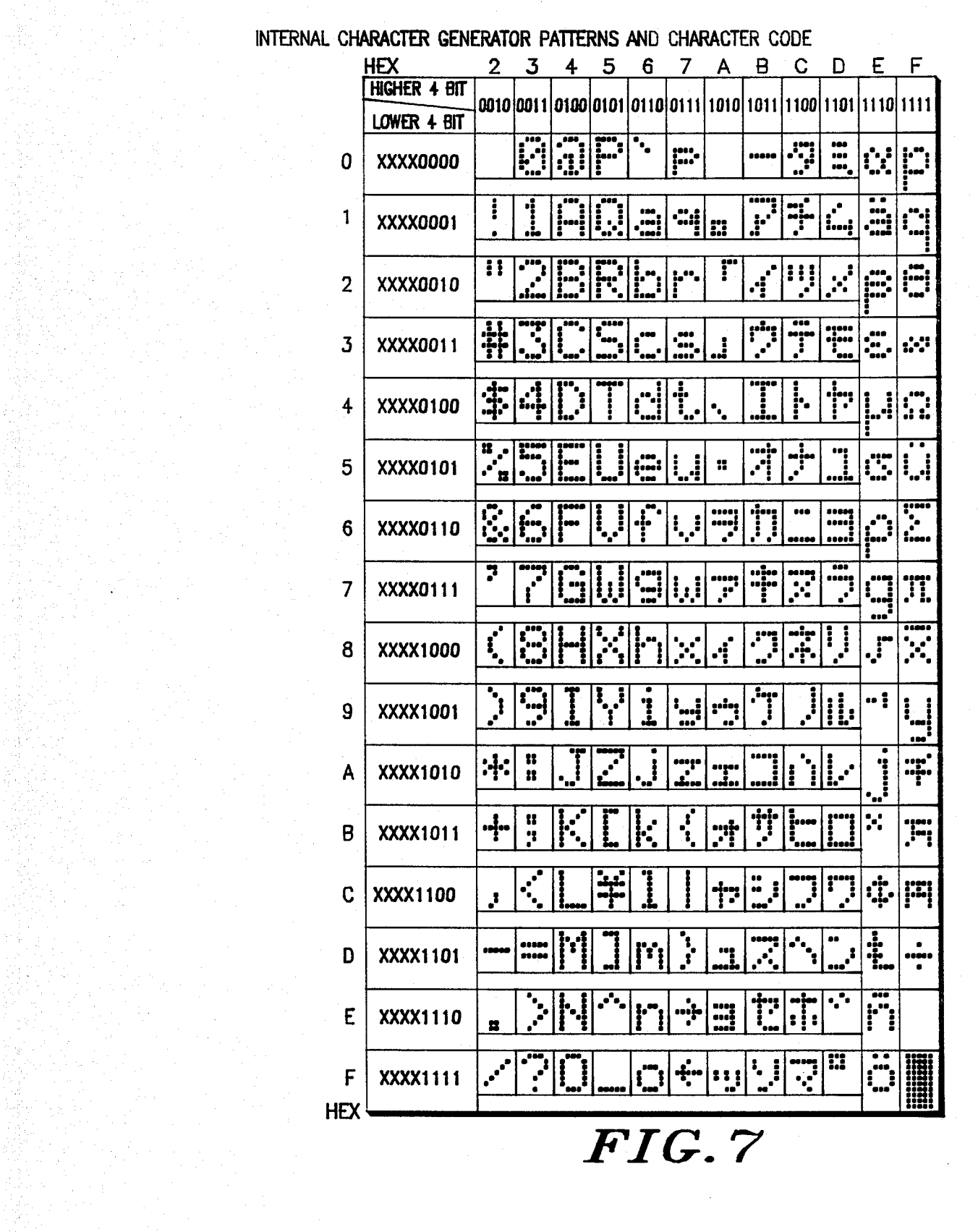

Referring to FIG. 7, there is shown for a plurality of symbols specific patterns for a specific character generator ROM 57 of display driver 56. It is to be understood that other character generator ROMS may be included in display means 44 for generating other symbols representative of other languages. Referring specifically to FIG. 7, the character generator ROM includes English characters in columns designated 2, 3, 4, 5, 6, and 7 hexidecimal and Kata Kana characters in designated columns A, B, C, and D hexidecimal. In a paging system such as the Golay Sequential Code paging scheme that transmits only 6 bits per character, a total of 64 unique characters can be transmitted. Therefore, to transmit more than 64 characters such as an alternate language, a control signal is generated to notify the microcomputer that an alternate language symbol is to be displayed. For example, if an English "A" is entered into the keyboard, the bit configuration for an "A" from the character codes of FIG. 7 show that an "A" is a 41 hexidecimal. The "A" is compressed in a Golay Sequential paging system to a 21 hexidecimal common character and transmitted without a control signal. It will be appreciated that other compression methods may be employed to compress the data to a common set of characters. When the character is received at the paging receiver, the microcomputer adds 20 hexidecimal to convert the common character to the character "A".

To transmit the Japanese symbol , a control character is entered in the keyboard followed by the symbol entered via the keyboard. The bit configuration for an " " is Cl hexidecimal. The is compressed in the Golay Sequential Code paging scheme to a 21 hexidecimal. Note that this is sent as the same bit configuration as an "A". The control signal and 21 hexidecimal are transmitted to the paging receiver. The control signal notifies the microcomputer that the alternate language set should be displayed, the microcomputer adds 20 hexidecimal, and then adds 80 hexidecimal for the alternate language set. Thus, the resultant character is 21 hexidecimal +20 hexidecimal+80 hexidecimal=Cl hexidecimal which displays the symbol .

For another example, assume that the word "PAGE" in English is sent to the paging receiver. The bit configuration for the word "page" is 50, 41, 47, 45 hexidecimal. The data is compressed to a common character set in the encoder according to the Golay Sequential paging scheme so that the bit configuration sent is 30, 21, 27, 25 hexidecimal. Since a control character is not sent before the word "PAGE", 20 hexidecimal is added by the receiver's microcomputer and the word "PAGE" is displayed on LCD panel 60. If a control character is sent before the word entered into the terminal, an additional 80 hexidecimal is added and the following symbols are displayed upon the panel display 60 . Note that the absence of a control signal notifies the microcomputer to use the first four columns in FIG. 7, or if a control character is encountered to shift and display the four columns A, B, C, and D hexidecimal of FIG. 7. As is evident from FIG. 7, if more bits are allowed to be transmitted for each character, more distinct symbols can be displayed without a control signal. For instance, if 7 bits are used to transmit a symbol, eight columns of information of FIG. 7 may be transmitted directly. With a control character preceding the base language, an alternate set of eight columns are displayed on display panel 60, giving a total of sixteen columns to be displayed. Because of the limitation in memory and time, a paging system data message scheme can increase throughput by minimizing the bit representation of transmitted data.

Referring briefly back to FIGS. 5A-B, note that the symbols of FIG. 7 are generated by individually illuminating a dot matrix for each character. The symbols of character generator ROM 57 as shown in FIG. 7 are permanently stored in the ROM. However, a number of special symbols can be generated by the microcomputer in character generator RAM 59 included in display means 44. The character set generated in the character generator RAM is software controllable (bit map stored in RAM memory) and can include any symbol represented by 5×7 dot matrix.

For purposes of illustration, FIG. 8 shows two sets of symbols microcomputer generated in RAM 59 used in the practice of this invention for use on a display pager. The character generator RAM 59 allows the special symbols in set 2 or set 3 to be generated on panel 60 by transferring a bit map of the symbols from the on chip RAM to the character generator RAM 59. The special symbol set 1 is already included on the character generator ROM 57 and does not have to be regenerated. Essentially, set 1 is already including in the character generator ROM 57 set of symbols, while set 2 or set 3 are regenerated each time in the character generator RAM 59. For instance, if a control character followed by a 7 is detected by microcomputer 36, a symbol as indicated in column 2, row 1, is generated in the character generator RAM 59 and then displayed on panel 60. Similarly, if a control character followed by the characters 8, 9, :, ;, <, =, >, ?, and @, a corresponding symbol is generated in the character generator RAM 59 and displayed in panel 60 according to column 2 of FIG. 8.

It is also noted that FIG. 8 shows an optional alternate language comprised of optional characters. The control character for the optional alternate language is an alternate key bit configuration as shown in column one of FIG. 8. That is, to activate the receiver's microcomputer to select the optional characters, the keyboard enters an alternate key followed by the key representing the optional character to be transmitted displayed. Thus, FIG. 8 shows another example of using a different control character to notify the microcomputer to select a particular symbol area.

4. Method for Transmitting Languages

For convenience sake, with respect to FIGS. 9A-B and 10A-B, the following assumption will be introduced, in that the character generator ROM includes a base language of English and an alternate foreign language of Kata Kana (Japanese). With a base language of English and an alternate language of Kata Kana, additional special symbols sets 1, 2, and 3 as shown in FIG. 8 can be displayed by sending an optional control character alternate) before a special character. For instance, if an optional control character followed by a 0 is transmitted to the paging receiver, the character uml/A/ is displayed.

Figure 9A:
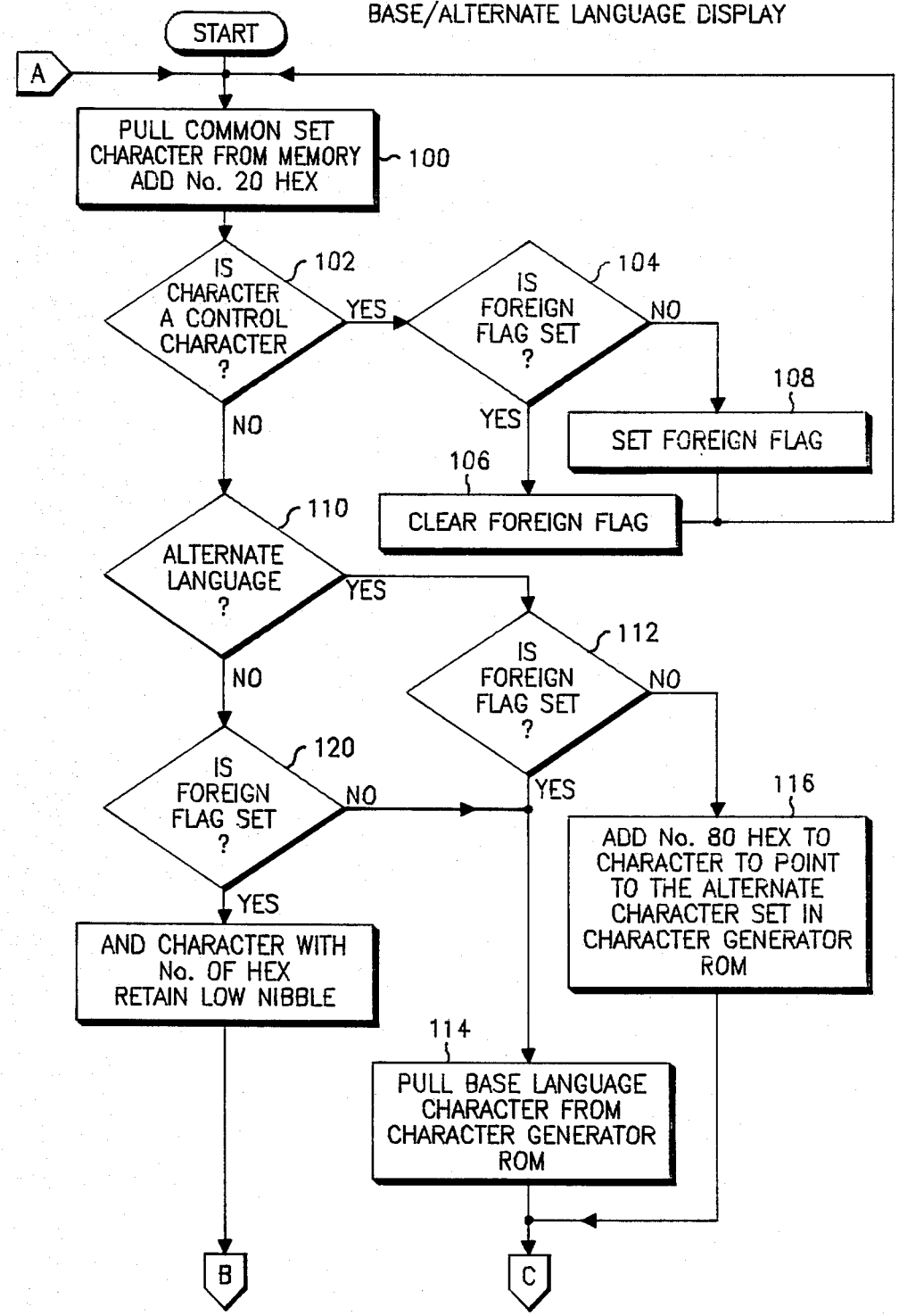
FIG. 9A–B is a flow chart describing a method for one embodiment of the present invention of displaying either a base or alternate language set.
Figure 9B:
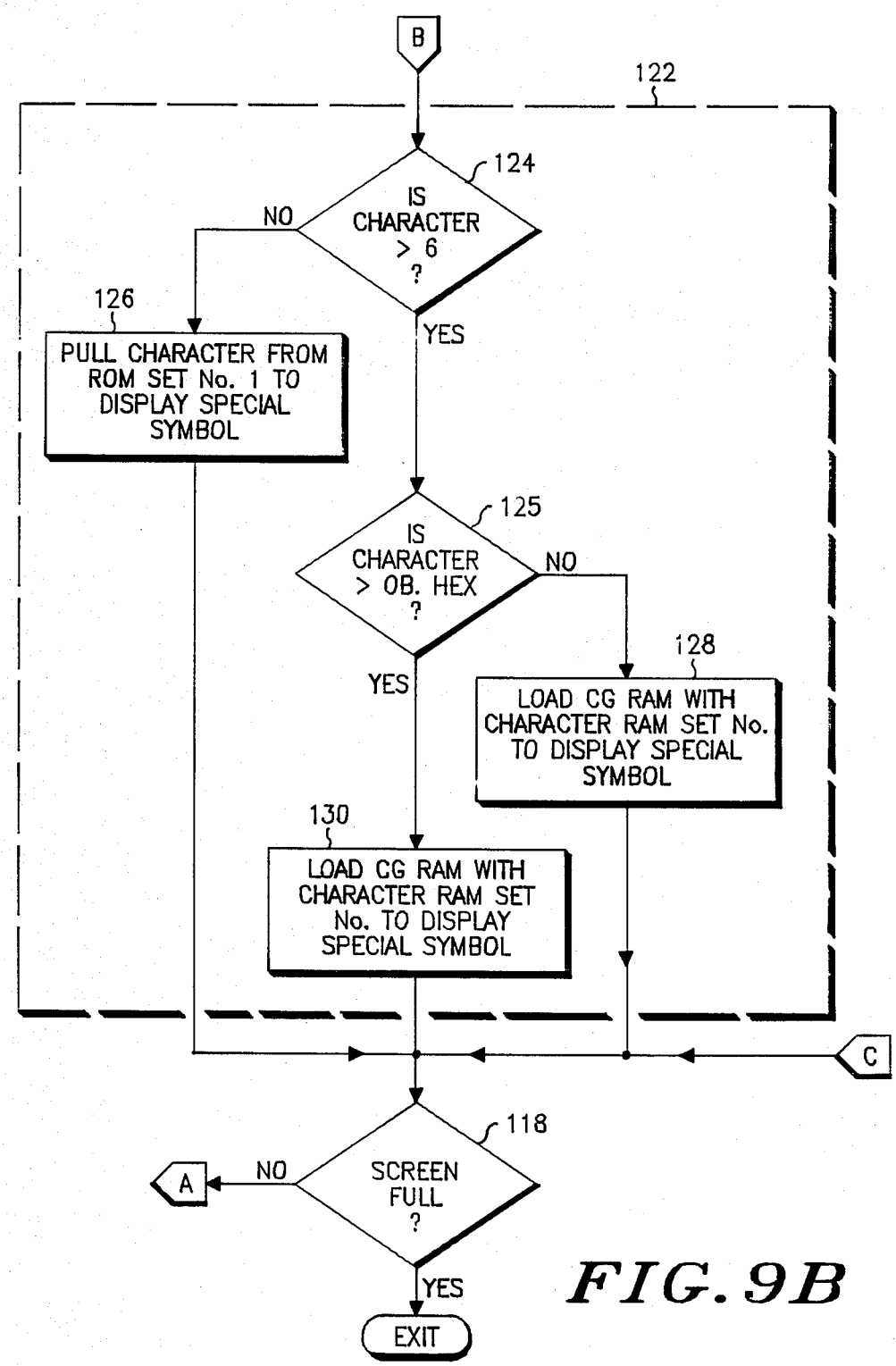

Referring to FIG. 9A-B there is shown a flow chart for determining whether to display the base or alternate language for a paging receiver using the Golay Sequential coding scheme. In this particular embodiment, the characters to be displayed on the LCD panel have been received by the paging receiver microcomputer and are stored in memory. At this point, the characters in memory are the compressed set of characters. In step 100, the microcomputer retrieves a compressed set character from memory. The microcomputer adds 20 hexidecimal to convert the compressed character value back to its common character value. The microcomputer then determines whether the character is a control character, step 102. If the character is a control character, this notifies the microcomputer that an alternate language set of the character generator ROM or character generator RAM is to be used to display an alternate language. If the microcomputer determines that the character is a control character, a foreign flag is checked to determine whether it has been previously set, step 104. If the foreign flag has been previously set, then the control character notifies the microcomputer that this is the end of the alternate language characters to be displayed.

For example, if in the data message an alternate language word is to be displayed, the first occurrence of the control character will signify the microcomputer to display the following characters that follow in the alternate character set. The second occurrence of the control character then notifies the microcomputer that this is the end of the alternate language characters. This is accomplished in steps 104, 106, and 108. If the foreign flag is set, then this is the end of the alternate language characters and the foreign flag is cleared, step 106. If the foreign flag has not been set, then this signifies that this is the first occurrence of the control character and the foreign flag is set in step 108. The method then loops back to step 100 in which a new character is retrieved from memory.

Eventually, a noncontrol character will be reached and the procedure will continue at step 110. At step 110, it is then determined whether the paging receiver is an alternate language mode. One way of determining if the paging receiver is in an alternate language mode is for the microcomputer to query the code memory to determine if the paging receiver has this option. After determining whether the receiver is an alternate language mode or a base language mode, the microcomputer then determines whether the foreign flag has been set, step 112. If the paging receiver is in the alternate language mode, and the foreign flag is set, then the characters are displayed in the basic language character set, step 114. Thus, the incident of an alternate language mode and the setting of the foreign flag causes the microcomputer to display the basic language character set. In other words, an alternate language mode with a control character displays the basic language character set.

If the foreign flag is not set and the receiver pager is in the alternate language mode, then the symbols transmitted to the paging receiver are displayed in the alternate character set, step 116. In this particular illustration for the Golay Sequential Code paging scheme, a hexidecimal 80 is added to the character to point to the alternate character set in the character generator ROM. The 80 hexidecimal is added to the character to generate an address to point to the upper end of the character generator ROM as was previously explained in reference to FIG. 7. After either the basic language character is displayed or the alternate character is displayed, the method proceeds to determine whether this is the end of message or if the screen is full, step 118. If the screen is full, the method is terminated and the microcomputer is placed in a wait state for the next message. If the screen is not full, the method begins at step 100, retrieving the next character from memory.

Referring back to step 110, if the receiver is in the base language mode, the method determines if the foreign flag has been set, step 120. If the foreign flag is set but the pager is not in the alternate language mode, then the pager displays the optional alternate language set, block 122. Block 122 as outlined by the phantom line is a process of displaying special characters based upon the particular configuration of the microcomputer and the paging scheme developed for the paging receiver. For example, the special symbol sets of FIG. 8 can be displayed along with the base language and alternate language. In this respect, the steps included in block 122 give an example for displaying the special characters of FIG. 8.

If the foreign flag is set, the first step in block 122 determines whether the character is greater than 6, step 124. This corresponds to a number of special symbols in character generator ROM. If the character is less than 6, then a special character is displayed from the ROM set 1 and displayed on the LCD panel, step 126. If the character is greater than 6, the method continues to check if the character is greater than 0B hexidecimal, step 126. This step determines whether the special character set is set 2 or special character set 3 as illustrated in FIG. 8. If the character is less than 0B, the character generator RAM of the LCD display is loaded with set 2 as defined in FIG. 8 and the special character is displayed. If the character is greater than 0B hexidecimal, the character generator RAM is loaded with the special character RAM set 3 as defined in FIG. 8 and the character is displayed on the LCD display, step 130. The method then determines whether the screen is full, step 118. If yes, the procedure puts the microcomputer in a wait state. If not, the procedure starts again at step 100, retrieving the next character from memory.

Figure 10A:
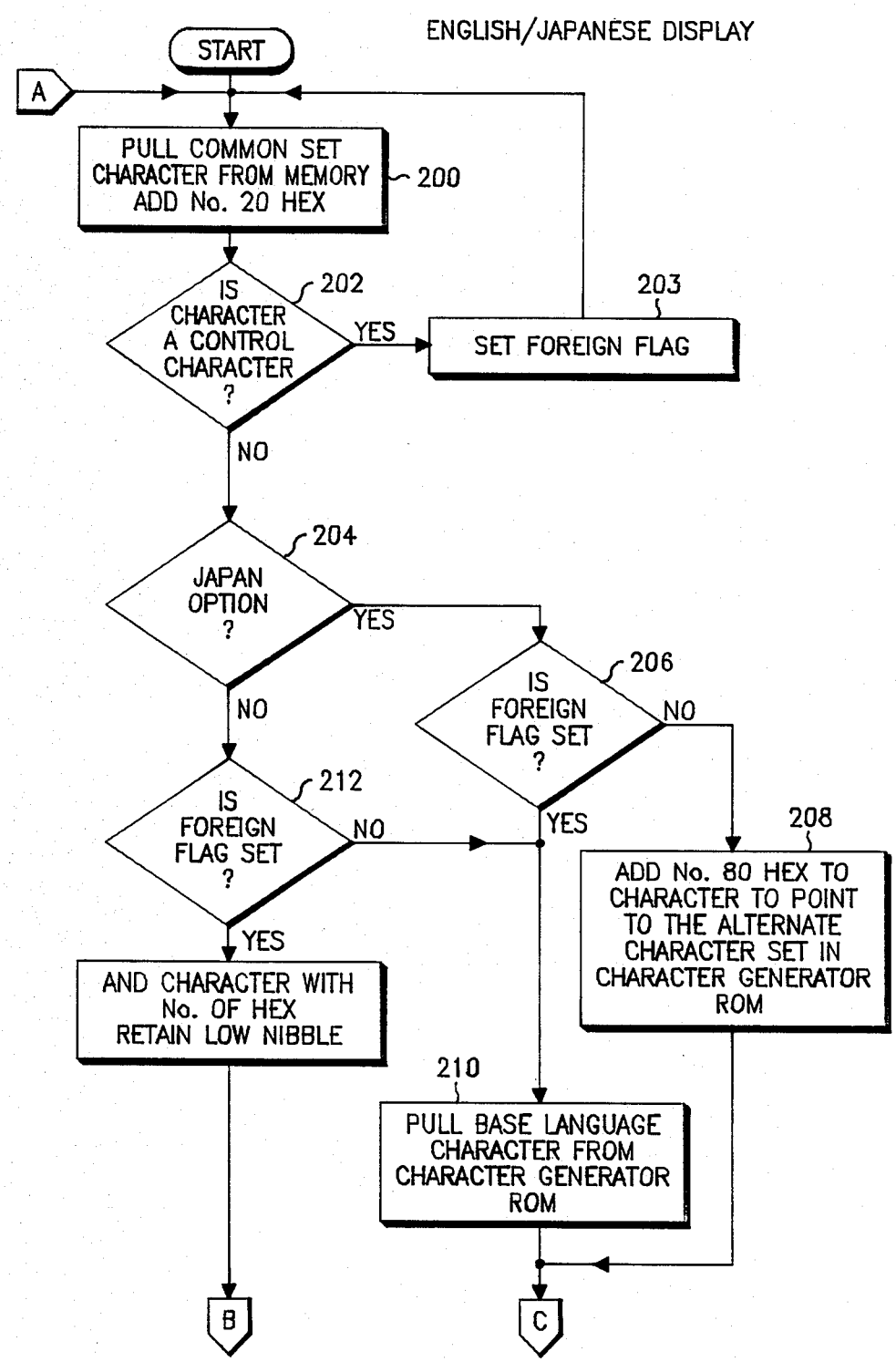
FIG. 10A–B is a flow chart detailing a method for a second embodiment of the present invention of displaying either English or Japanese symbols on a paging receiver.
Figure 10B:
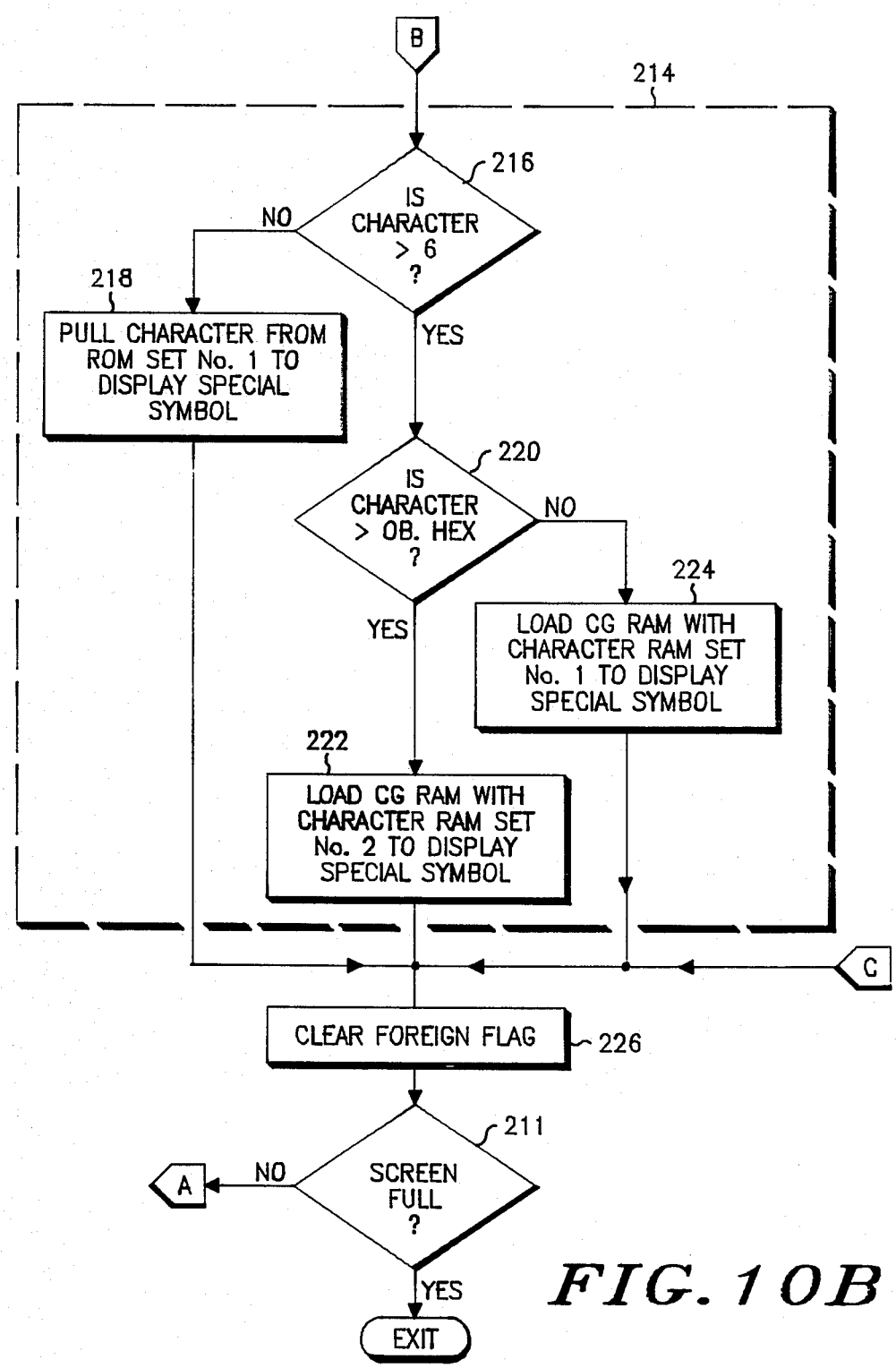

FIG. 10A-B is a flow chart for another embodiment using the method of the present invention. The method of FIG. 10A-B illustrates an embodiment using English as a base language, Japanese as an alternate language, and the special characters of FIG. 8 as an optional alternate set. As previously described, the paging receiver receives a message from the base terminal in either English, Japanese, special foreign characters, or a combination of both. The method begins by retrieving the common set character stored previously in memory by the microcomputer when it is received from the transmitter. The microcomputer adds 20 hexidecimal or a predetermined value to convert the comprised character value to a common set character, step 200. In this particular embodiment, a control character before each alternate language character is sent. That is, before each alternate language character, a control character is sent. This is different than FIG. 9A-B in which a control character is sent preceded a string of alternate language characters, and a control character following the string of alternate language characters. Referring back to FIG. 10A-B, if a control character is detected, step 202, then a flag signifying that an alternate language character is to be displayed is set, step 203. The procedure then begins back by retrieving another character from memory, step 200.

After a control character is sent, the character following will either be a Japanese character, an English character, or a special foreign character. It will be a Japanese character if the paging receiver is in an English page mode, or the character will be an English character if the paging receiver is in a Japanese page mode. The language mode of the paging receiver is determined by quering the code memory. If the paging receiver is in the Japanese page mode, it is determined whether the foreign flag is set, step 206. If the foreign flag is not set, this signifies that the character is a Japanese character. As previously described with reference to FIG. 9, 80 hexidecimal is then added to the character to point the microcomputer to the correct Japanese character in the character generator ROM and the character is displayed, step 208. The foreign flag is cleared, step 226. If the screen is full, the microcomputer goes into a wait step, step 211. If the screen is not full, the method starts again by retrieving a character from memory, step 200.

Referring back to step 206, if the foreign flag is set and the paging receiver is in a Japanese page mode, this signifies that an English character is to be displayed. Thus, an English character is retrieved from the character generator ROM and displayed on the LCD, step 210. After the character is displayed, the foreign flag is cleared and is then determined whether the screen is full or not, step 210.

Referring back to step 204, if the paging receiver is not in the Japanese page mode, then it is in the English page mode. It is next determined whether the foreign flag is set to notify the microcomputer that a special foreign character is to be displayed rather than a Japanese or English character, step 212. The method then proceeds to block 214 encosed in a phantom line to determine from the received bit configuration which special foreign character to display. Block 214 represents a number of schemes that can be utilized to display foreign character sets. In this particular embodiment, there is shown a method for determining the special characters to display based upon the special foreign characters in FIG. 8.

The first step is to determine whether the special character to be displayed is greater than 6, step 216. If the character is less than 6, the special character is retrieved from the character generator ROM set and displayed on the LCD panel, step 218. If the character is greater than 6, the character is then tested to determine whether it is greater than 0B hexidecimal, step 220. If the character is greater than 0B hexidecimal, then the character is retrieved from the character generator RAM set number 3 as defined in FIG. 8. If the character is less than 0B, the character is retrieved from the character generator RAM set number 2 as defined in FIG. 8, step 224. It is important to note that the characters for character generator RAM set number 2 and character generator RAM set number 3 of FIG. 8 are generated in the microcomputer by storing the particular dot configuration in memory, loading the character generator RAM, and then retrieving the character from RAM set to display the character. The procedure then displays the character on the display panel. The foreign flag is cleared and it is then determined whether the screen is full or not, step 211. If the screen is full, then the microcomputer goes into a wait state for the next message.

Thus, there has been shown an apparatus and method for transmitting a plurality of languages to a paging receiver in a paging system. Information including a base language or at least one alternate language is entered via a keyboard into a base terminal. The base language is associated with the operational mode of the paging receiver. Each language is associated with a control character to notify the paging receiver of the presence of an alternate language. The base language symbols and alternate language symbols are converted to a common set of symbols. The information including the plurality of common symbols are transmitted to a selected plurality of paging receivers. A processing means such as a microcomputer in the paging receiver decodes the information for determining the language to display. The microcomputer determines which language to display by determining the mode of the receiver and detecting the control character transmitted by the terminal. In one form of the invention, when the paging receiver is in the base language mode and a control character is received, the alternate language is displayed. When the paging receiver is in the alternate language mode and a control character is detected, the base language is displayed. In this manner, a paging receiver user can receive a multiplicity of languages.

The above described embodiments of the invention are illustrative only and that modifications that may occur to those skilled in the art. Accordingly, this invention is not to be regarded as limited to the embodi-

We claim:

1. A system for transmitting information to a plurality of paging receivers, the information including a plurality of languages, said system comprising:
   (a) means for entering the information, the information including at least one data message having a plurality of languages, a language being comprised of a plurality of symbols and a corresponding control signal representative of the language of the symbols;
   (b) means for coding the plurality of symbols and control signal into a message format adapted for transmitting information to a plurality of paging receivers;
   (c) means for transmitting the information to at least one of the plurality of paging receivers;
   (d) means for decoding the information at the paging receiver for recovering a plurality of symbol signals and a control signal wherein each symbol signal corresponds to a transmitted language symbol and the recovered control signal represents the language of the symbol signals;
   (e) means for converting each of said symbol signals to a corresponding symbol according to the recovered control signal including:
      means for choosing a predetermined set of symbols in accordance with the recovered control signal; and
      means for selecting from the predetermined set of symbols, a symbol corresponding to the symbol signal; and
   (f) mean for displaying each of the corresponding symbols, including a logic means and a memory means, wherein said memory means includes a plurality of language symbol areas, each area including a plurality of displayable symbols, and wherein said logic means produces address signals to choose a language symbol area in accordance with the recovered control signal and a language mode of the receiver, for selecting a displayable symbol from said language symbol area to display said selected symbol.

2. The system of claim 1, wherein the display means includes a dot matrix liquid crystal display for producing a text display of the symbols.

3. The system of claim 1, wherein the input means includes a keyboard having a plurality of keys selectively mapped in at least one base language and further wherein the language mode of the receiver includes a base language mode associated with a base language of the keyboard.

4. The system of claim 3, wherein the keyboard includes at least one control key to select between said base language and at least one alternate language, wherein said control key generates said control signal representative of the language.

5. The system of claim 4, wherein the base language includes a first alphabetic language such as English, French, German and the alternate language includes a second alphabetic language, being different than the first alphabetic language, such as English, French, Spanish.

6. The system of claim 4, wherein the base language includes a first alphabetic language such as Japanese, Chinese and the alternate language includes a second ideographic language, being different than the first ideographic language, such as Japanese, Korean.

7. The system of claim 4, wherein the base language is an ideographic language such as Japanese, Chinese and the alternate language includes an alphabetic language such as English, French, Spanish.

8. The system of claim 4, wherein the base language includes an alphabetic language such as English, French, German and the alternate language includes an ideographic language such as Chinese or Korean.

9. A method for transmitting information including a plurality of languages to a paging receiver in a paging system, the paging system including an input means, an encoder, and a transmitter, said method comprising the steps of:
   (a) entering the information with the input means, the information including at least one data message having a plurality of languages, a language being comprised of a plurality of symbols and a corresponding control signal representative of the language of the symbols;
   (b) converting each symbol of the language into a corresponding character of a set of common characters;
   (c) coding the common set of characters and control signal into a message format adapted for transmitting information to a plurality of paging receivers;
   (d) transmitting the information to at least one of a plurality of paging receivers;
   (e) decoding the information at the paging receiver for providing a plurality of symbol signals and a recovered control signal wherein each symbol signal corresponds to a transmitted language symbol and said recovered control signal represents the language of the symbol signals;
   (f) choosing a predetermined set of symbols in accordance with the recovered control signal;
   (g) adding a predetermined value to the symbol signal corresponding to the recovered control signal;
   (h) selecting from the predetermined set of symbols, a symbol corresponding to the symbol signal;
   (i) converting each of the symbol signals to a symbol corresponding to the recovered control signal; and
   (j) displaying the symbol for producing a display of the symbols.

10. The method of claim 9, wherein step (b) of converting further includes:
   (h) converting each symbol to a digital common character, wherein each digital common character is comprised of a first predetermined number of bits; and
   (i) compressing the total common character bits to a predetermined number of bits is less than the total of the common character bits.

11. The method of claim 10, wherein step (i) of compressing includes the step of subtracting a predetermined value from each character.

12. A method for displaying a plurality of symbols in a paging receiver having a memory comprised of at least two symbol areas, each area being representative of a language and associated with an operating mode of the receiver, one of the symbols areas being a base language symbol area and the other symbol area being an alternate language symbol area, and further wherein each symbol area is comprised of a plurality of characters, wherein each character is representative of a displayable symbol, said method comprising the steps of:

(a) providing a control signal as part of one or more data messages transmitted to the paging receiver, wherein each data message includes the base language and the alternate language, each language being a plurality of symbol signals and further wherein the control signal represents the language of the characters associated with the receiver, each of said data messages comprising one or more characters in the language designated by said control signal;

(b) choosing the alternate language symbol area in response to the control signal;

(c) choosing the base language symbol area in response to the absence of the control signal;

(d) selecting a character from the chosen symbol area corresponding to the symbol signal; and (e) displaying a symbol corresponding to the selected character for creating a text display of the symbol signals in the paging receiver.

13. The method of claim 12, wherein the step (a) of providing further includes providing the control signal for each alternate language symbol to cause the paging receiver to display each alternate language symbol.

14. The method of claim 12, further including the step of providing the control signal on the first occurrence of an alternate language symbol to cause the paging receiver to display alternate language symbols and further providing the control signal on the last occurrence of an alternate language symbol to cease the display of alternate language symbols.

15. The method of claim 12, wherein the paging receiver further includes a processing means for generating displayable symbols and the memory includes a special symbol area and wherein step (b) of choosing further includes:

(g) generating special symbols with the processing means in the special symbol area; and (h) retrieving the special symbols from the special symbol area to display the special symbols when selected by the control signal.

16. In a paging system having a base terminal for transmitting information and at least one selectable paging receiver for receiving information, a method for displaying a plurality of individual selectable languages in a paging receiver, each language comprised of a plurality of selectable symbols, wherein the paging receiver includes a memory having a plurality of languages symbol areas, and further wherein the paging receiver preselects a language to display according to a language mode, said method comprising the steps of:

(a) providing a control signal indicative of a language as a part of a data message comprising one or more characters included in the information transmitted to the paging receiver, wherein the data message includes a plurality of languages comprised of symbol signals representative of symbols entered into the base terminal;

(b) determining the language mode of the paging receiver;

(c) detecting the control signal to choose a language area according to the control signal and to the language mode of the paging receiver;

(d) selecting a symbol from the chosen language area according to a symbol signal; and (e) displaying the symbol for creating a display of symbol signals.

17. The method of claim 16, wherein the language mode is stored in the paging receiver memory and further wherein the step (b) of determining further includes the step of recalling from the receiver memory the language mode of the paging receiver.

18. The method of claim 16, wherein the step (e) of displaying further includes printing the displaying on a hard copy unit.

19. A paging receiver having a means for receiving and decoding transmitted coded information including at least one data message comprising one or more characters, each of said data messages having a language and a control signal wherein the language comprises a plurality of characters and the control signal represents the language of the characters, a means for displaying the information comprising:

a first memory means comprised of a plurality of symbol areas, each area being representative of one of a plurality of languages;

a microcomputer coupled to the first memory means, said microcomputer processing the data message for choosing at least one symbol area in accordance with the control signal and selecting a character from the chosen symbol area corresponding to a received character;

a second memory means connected to said microcomputer for storing information for use by said microcomputer; and a display means responsive to said microcomputer for displaying the selected character.

20. A display paging receiver comprising:

means for receiving at least one data message comprised of a control signal and data information comprising one or more characters representing a first language and second language, each language comprised of a plurality of symbols and the control signal representative of which language to display;

first memory means comprised of a first and second symbol area, each area being representative of the first and second language respectively;

processing means responsive to said receiving means for detecting the control signal, said processing means choosing the first symbol area upon detecting the presence of the control signal or choosing the second symbol area in the absence of the control signal said processing mean selecting a symbol from the chosen symbol area corresponding to a received symbol in the data information; and display means responsive to said processing means for displaying the selected symbol.

21. The display of claim 20 further including:

second memory means coupled to said processing means for providing a language mode signal to the processing whereby the processing means chooses the second symbol area upon detecting the control signal or chooses the first symbol area in the absence of the control signal.

22. The paging receiver of claim 20 wherein the first language comprises a first alphabetic language and the second language comprises a second alphabetic language.

23. The paging receiver of claim 20 wherein the first language comprises an alphabetic language and the second language comprises an ideographic language.

24. The paging receiver of claim 20 wherein the first language comprises an ideographic language and the second language comprises an alphabetic language.

25. The paging receiver of claim 20 wherein the first language comprises a first ideographic language and the second language comprises a second ideographic language.

26. A display paging receiver comprising:
means for receiving at least one data message transmission, the data message transmission comprised of a control signal and data information representative of a language, the data information comprised of a plurality of characters and the control signal representative of the language, each character being represented by a binary word comprised of less than 8 bits;
memory means comprised of at least a first and second symbol area, each area being representative of a first and second language respectively;
processing means responsive to said receiving means for detecting the control signal, said processing means choosing the first symbol area upon detecting the control signal or choosing the second symbol area in the absence of the control signal, said processing means further selecting a symbol from the chosen symbol area corresponding to a received character in the data information; and
display means responsive to said processing means for displaying the selected symbol.

* * * * *